Aug. 16, 1966  J. E. THOMAS ET AL  3,266,616
CONTINUOUS PROOFER
Original Filed Oct. 1, 1962  9 Sheets-Sheet 1

INVENTOR.
JOE E. THOMAS
JULIAN RAPPAPORT

Learman, Learman & McCulloch
Attorney

INVENTOR.
JOE E. THOMAS
JULIAN RAPPAPORT

Learman, Learman & McCulloch
Attorney

Aug. 16, 1966   J. E. THOMAS ET AL   3,266,616
CONTINUOUS PROOFER
Original Filed Oct. 1, 1962   9 Sheets-Sheet 7

INVENTOR.
JOE E. THOMAS
JULIAN RAPPAPORT

Learman, Learman & McCulloch
Attorney

INVENTOR.
JOE E. THOMAS
JULIAN RAPPAPORT

Learman, Learman & McCulloch
Attorney

Aug. 16, 1966     J. E. THOMAS ET AL     3,266,616
CONTINUOUS PROOFER
Original Filed Oct. 1, 1962     9 Sheets-Sheet 9
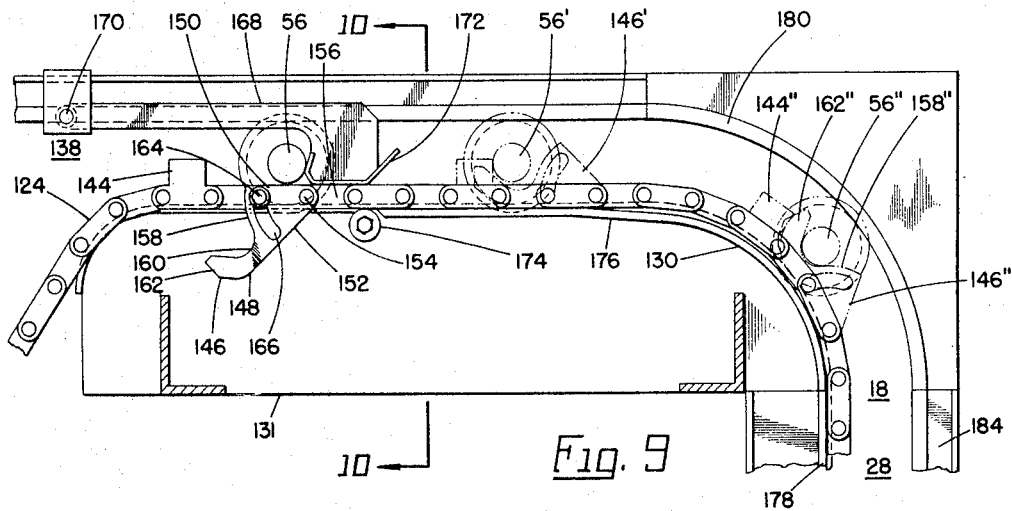
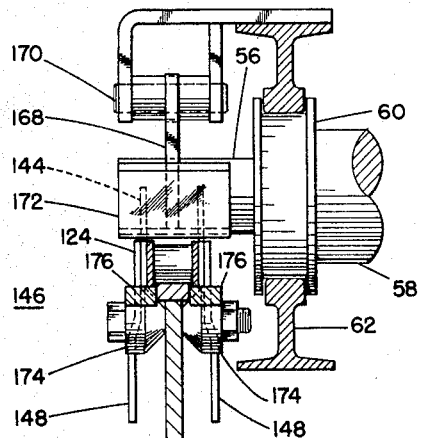
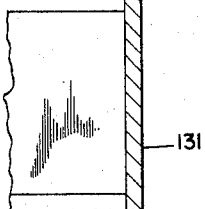
*INVENTOR.*
JOE E. THOMAS
JULIAN RAPPAPORT
Learman, Learman & McCulloch
Attorney

3,266,616
CONTINUOUS PROOFER

Joe E. Thomas and Julian Rappaport, York, Pa., assignors, by mesne assignments, to Baker Perkins Inc., New York, N.Y., a corporation of New York
Original application Oct. 1, 1962, Ser. No. 227,497, now Patent No. 3,168,187, dated Feb. 2, 1965. Divided and this application Dec. 23, 1963, Ser. No. 350,135
6 Claims. (Cl. 198—85)

This application is a division of parent application Serial No. 227,497, now Patent No. 3,168,189, issued February 2, 1965.

This invention relates to article handling apparatus wherein articles are loaded on and unloaded from successive article carriers arranged to be moved in a closed loop through a treating chamber. More particularly the invention relates to a proofer in which a plurality of multi-shelved racks are movable in a closed loop including upper and lower generally horizontal rack supporting tracks connected by elevator and lowerator means at their ends. Such closed loop systems normally include curvate guide track means connecting the horizontal upper tracks with vertically extending guide track means at the ends of the horizontally extending tracks.

A prime object of the invention of the present application is to provide mechanism associated with the rack transport system for positively controlling the passage of racks from the upper horizontal tracks to the lowerator means to prevent uncontrolled drops which would subject the dough products in the pans on the shelves of the racks to shocks which would deflate them.

A further object of the invention is to prevent the uncontrolled coasting of racks supported on the upper tracks which might interfere with the descent of racks on the lowerator means and jar the dough products supported by the racks in question.

Another object of the invention is to provide mechanism associated with the system which smoothly transfers the racks in a highly reliable and efficient manner.

Other objects and advantages reside in certain novel features of the construction, arrangement and combination of parts which will be hereinafter more fully described, reference being had to the accompanying drawings forming a part of this specification, and in which drawings:

FIGURE 9 is an enlarged fragmentary view of the upper portion of the rack lowering means of FIGURE 8 showing the latch means; and FIGURE 10 is a sectional view taken on line 10—10 of FIGURE 9.

Figure 1:
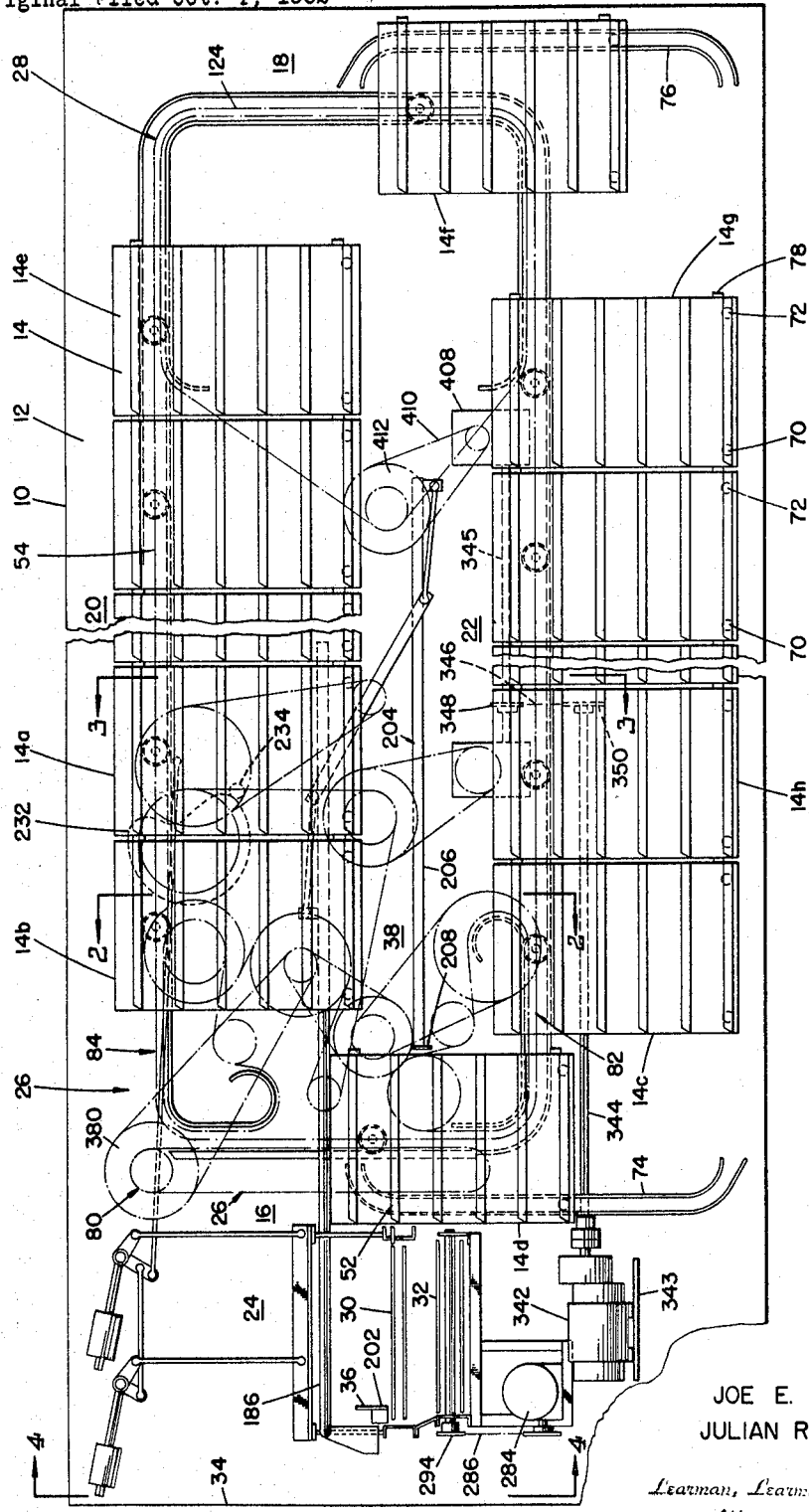
FIGURE 1 is a longitudinal vertical section through the proofer with the various elements contained therein shown more or less diagrammatically.

Referring particularly to FIGURE 1, my novel proofer comprises a generally rectangular elongated housing 10 defining a proofing chamber 12 through which racks 14, carrying pans of dough to be proofed, travel in an elongated closed loop including an ascending run 16 near the forward end of the housing 10, a descending run 18 adjacent the rearward end of the housing 10, an upper horizontal run 20 and a lower horizontal run 22.

The housing 10 is preferably formed of sheet metal panels supported by suitable skeleton framework, and air under such temperature and relative humidity for the proofing of dough is supplied to the proofing chamber 12 by suitable air conditioning means, not shown.

The racks 14 are of generally conventional design, and may be conveniently constructed, wtih some slight modifications hereinafter adverted to, in accordance with Graham Patent No. 3,007,583 of November 7, 1961. The racks 14 are in the nature of an open rectangular framework, having a plurality of vertically spaced horizontal shelves, all made up of metal bars, tubing, or the like, the shelves being adapted to support a plurality of pan sets.

The forward end of the proofing chamber 12 is arranged to provide a loading and unloading station 24, at which station ranks of pan sets of dough to be proofed are loaded onto the shelves of the racks 14 and ranks of pan sets of dough that have been proofed are unloaded from the shelves of the racks 14.

Elevating means, indicated as a whole by the reference numeral 26 raises successive racks 14 through the ascending run 16 past the loading and unloading station 24 from the lower horizontal run 22 to the upper horizontal run 20. Lowering means, indicated as a whole by the reference numeral 28 lowers successive racks 14 through the descending run 18 from the upper horizontal run 20 to the lower horizontal run 22.

A pair of horizontal, vertically spaced conveyors 30 and 32 extend transversely within the housing 10 in the loading and unloading station 24 between the rack elevating means 26 and the front wall 34 of the proofer housing 10. These conveyors may be of any suitable type for conveyance of pan sets as, for example, slat type conveyors well known in the art. The upper conveyor 30, hereinafter referred to as the loading conveyor, conveys the pan sets of dough in the proofer to a position in front of the rack being elevated by the elevating means 26, where pusher means, hereinafter referred to as the loading pusher 36, pushes successive ranks of pan sets from the loading conveyor 30 onto successive shelves of a rack 14 as the rack is elevated past the loading and unloading station 24. The lower conveyor 32, hereinafter referred to as the unloading conveyor, is adapted to convey laterally from the loading and unloading station 24 successive ranks of pan sets of proofed dough which have been pushed from successive shelves of a rack 14 onto the unloading conveyor 32 by pusher means, hereinafter referred to as the unloading pusher 38.

Figure 4:
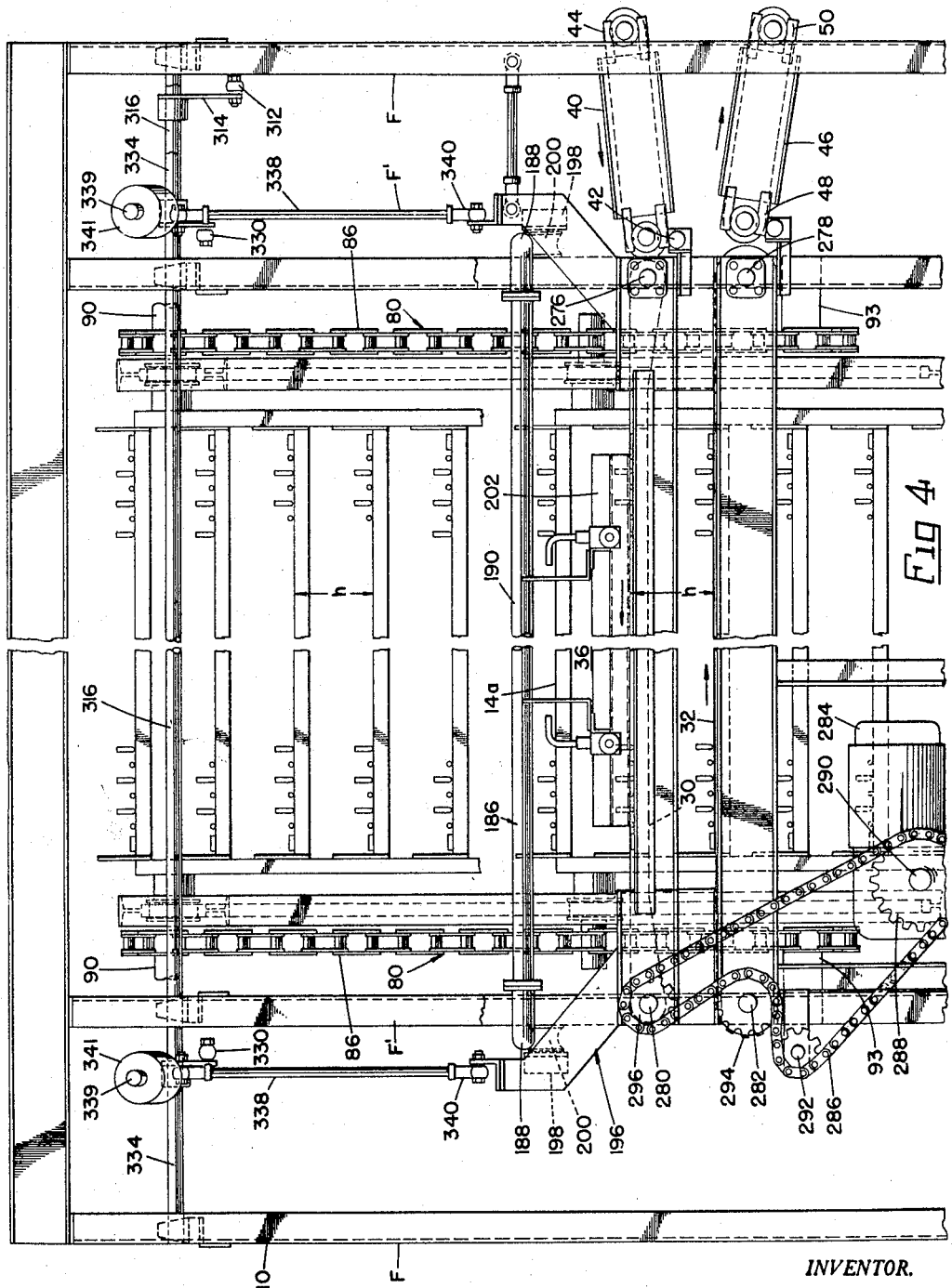
FIGURE 4 is a front elevation of the proofer taken on the line 4—4 of FIGURE 1.

Referring particularly to FIGURE 4, there is shown an auxiliary pan set delivery conveyor 40 supported at its inner end, as at 42, on one end of the loading conveyor 30 for pivotal and relative endwise movement with respect thereto, and pivotally supported, as at 44, at its outer end to the outer skeleton frame F of the housing 10. Similarly, an auxiliary pan set discharge conveyor 46 is supported at its inner end, as at 48, on one end of the unloading conveyor 32 for pivotal and relative endwise movement with respect thereto, and is pivotally supported, as at 50, at its outer end to the outer skeleton frame F of the housing 10. The purpose of the auxiliary conveyors 40 and 46 which may be of slat or other suitable type, and their pivotal and extensible mounting will become apparent later in the description.

It is evident that pan sets of dough to be proofed, may be delivered from a source, such as a moulder panner, by a suitable conveyor, neither of which is shown, to the outer end of the auxiliary conveyor 40 which, in turn, delivers them to the loading conveyor 30 for presentation in front of the racks to be loaded. It is also evident that the pan sets of proofed dough discharged from the racks onto the unloading conveyor 32 are conveyed thereby to the auxiliary conveyor 46 which, in turn, discharges them from the housing 10, where they may be delivered onto a suitable conveyor, not shown, and transported to the baking oven, not shown.

As shown in FIGURE 4 and facing the front of the proofer, the pan sets of unproofed dough are introduced into the proofer by the conveyors 40 and 30 from the right side and the pan sets of proofed dough are discharged by the conveyors 32 and 46 through the right side. It is evident, however, that by transposing one or both auxiliary conveyors 40 and 46 to the left side and by operating the conveyors 30, 32, 40 and 46 in appropriate directions, pan sets can be delivered through either side and discharged from the opposite side or can be delivered through and discharged from the left side, as convenience dictates.

For the purpose of orienting various elements of the proofer, the sides thereof will be referred to throughout the description as the left and right sides when viewing the proofer from the front as shown in FIGURE 4.

Racks

Figure 3:
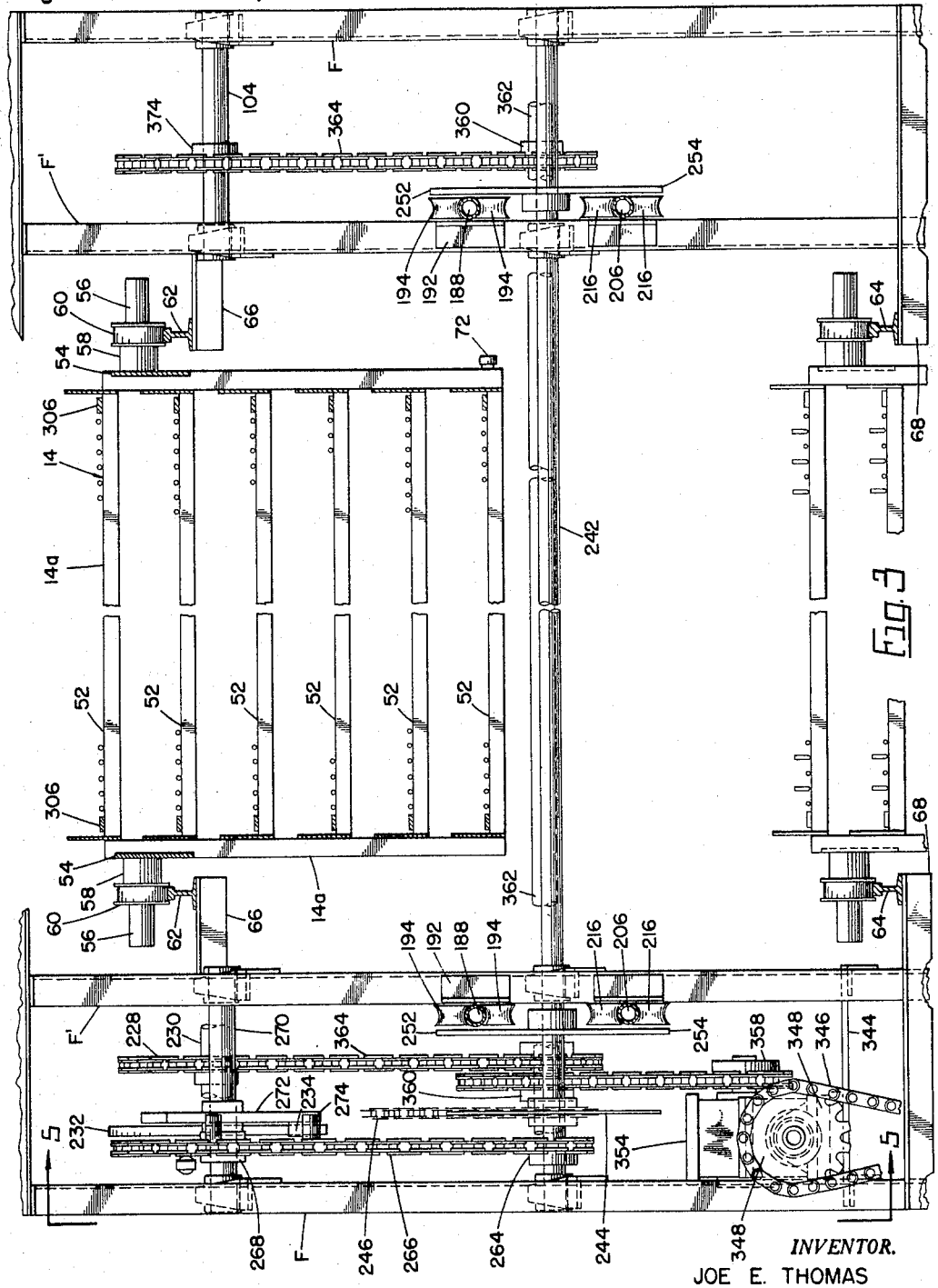
FIGURE 3 is a sectional view taken on line 3—3 of FIGURE 1.

The racks 14 are all identical in construction, so that in describing any one particular rack it will be understood that the other racks are similarly constructed. Referring particularly to FIGURES 1 and 3, rack 14a is shown as having six equidistantly spaced shelves 52. While, for purpose of illustration, the racks 14 are shown with six shelves and the operation of the apparatus is described hereinafter in respect of racks with six shelves, it will become apparent that the apparatus is equally adapted to handle racks with a lesser or greater number of shelves.

Each of the racks 14 has a plate 54 welded or otherwise secured across the upper portion of its opposite ends. Extending from the face of each the plates 54 laterally outward of the racks 14, is a stub shaft 56 mounted in a sleeve 58 which is welded to the plate 54. The stub shafts 56 are disposed above the center of gravity of the racks 14 and located centrally between the front and rear sides of the racks. The outer ends of the stub shafts 56 are engaged by the elevating means 26 in transporting succesive racks from lower run 22 to upper run 20; and are also engaged by lowering means 28 in transporting successive racks from upper run 20 to lower run 22, as will be described in detail hereinafter. Rotatably mounted on each of the stub shafts 56 inwardly of its free end is a flanged wheel 60 arranged to engage longitudinally extending tracks disposed along the upper and lower runs 20 and 22. Referring particularly to FIGURE 3, there are shown upper tracks 62 and lower tracks 64 supported, respectively, on upper brackets 66 and lower brackets 68 which are rigidly secured to the skeleton framework and project inwardly of the inner skeleton frame F'. The tracks 62 and 64 provide guide supports along which the wheels 60 are adapted to roll in moving the racks 14 along the upper and lower runs 20 and 22.

The spaced inner and outer skeleton frames F' and F at each side of the proofer are each formed by a plurality of vertical and longitudinally extending angle frame members and throughout the description the frame members forming the inner frame are referred to collectively as inner frame F' and frame members forming the outer frame are referred to collectively as outer frame F.

Each of the racks 14 supports a pair of laterally disposed outboard rollers 70 and 72, located respectively adjacent the lower forward and rearward corners of the racks on the left side thereof. The forward outboard roller 70 is arranged to engage in a vertically extending guideway 74 at the forward left side of the proofer to assist in stabilizing the rack as it is elevated through the ascending run 16 from the lower run 22 to the upper run 20. The rearward outboard roller 72 is arranged to engage in a vertically extending guideway 76 at the rearward left side of the proofer to assist in stabilizing the rack as it is lowered through the descending run 18 from the upper run 20 to the lower run 22.

Each of the racks 14 is also provided on one side with a plurality of bumpers 78 arranged to engage an adjacent rack to provide suitable spacing between adjacent racks as they are moved along the upper and lower tracks 62 and 64 of upper and lower runs 20 and 22, respectively.

Elevating conveyor

Figure 2:
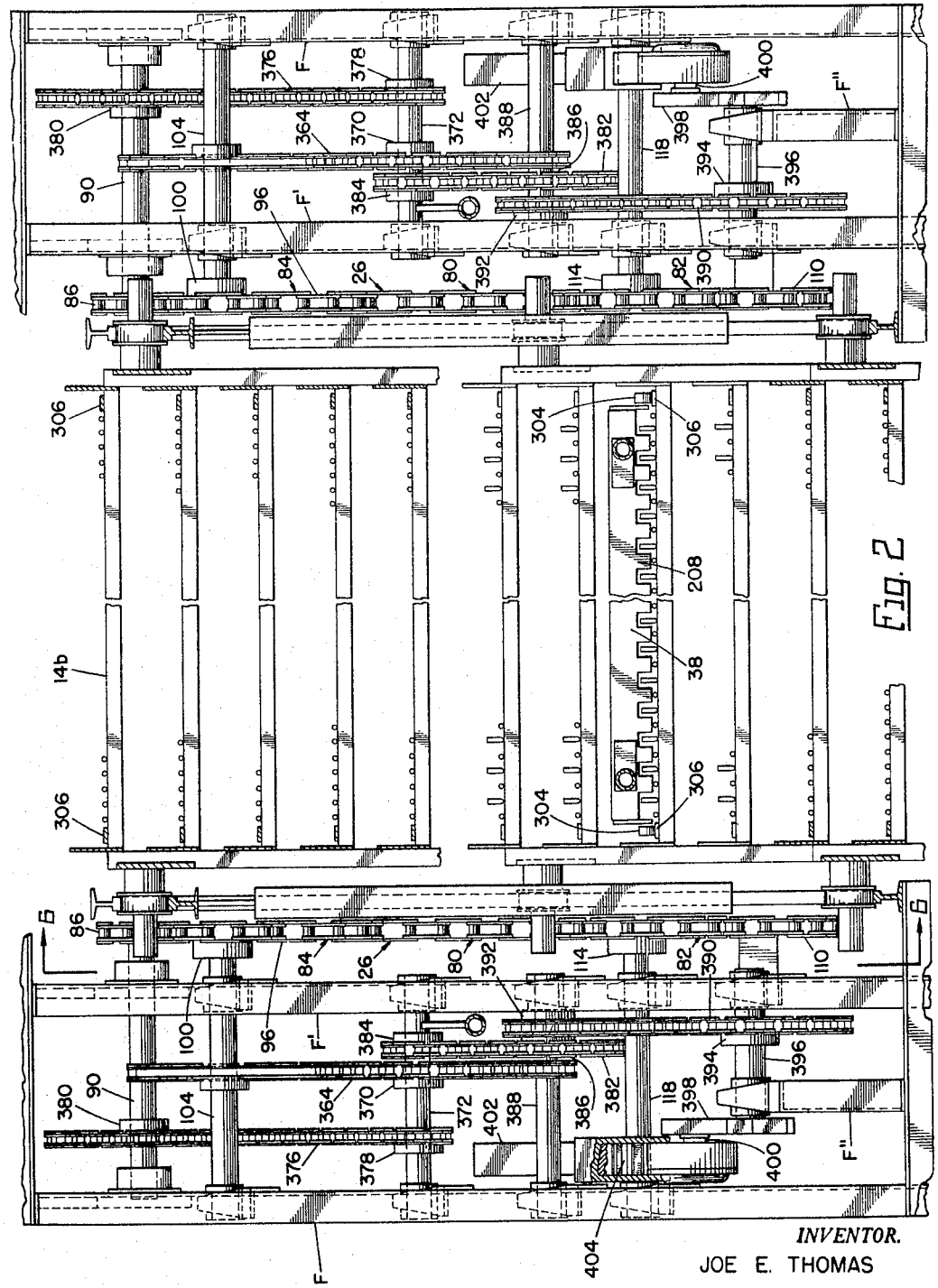
FIGURE 2 is a sectional view taken on line 2—2 of FIGURE 1.
Figure 6:
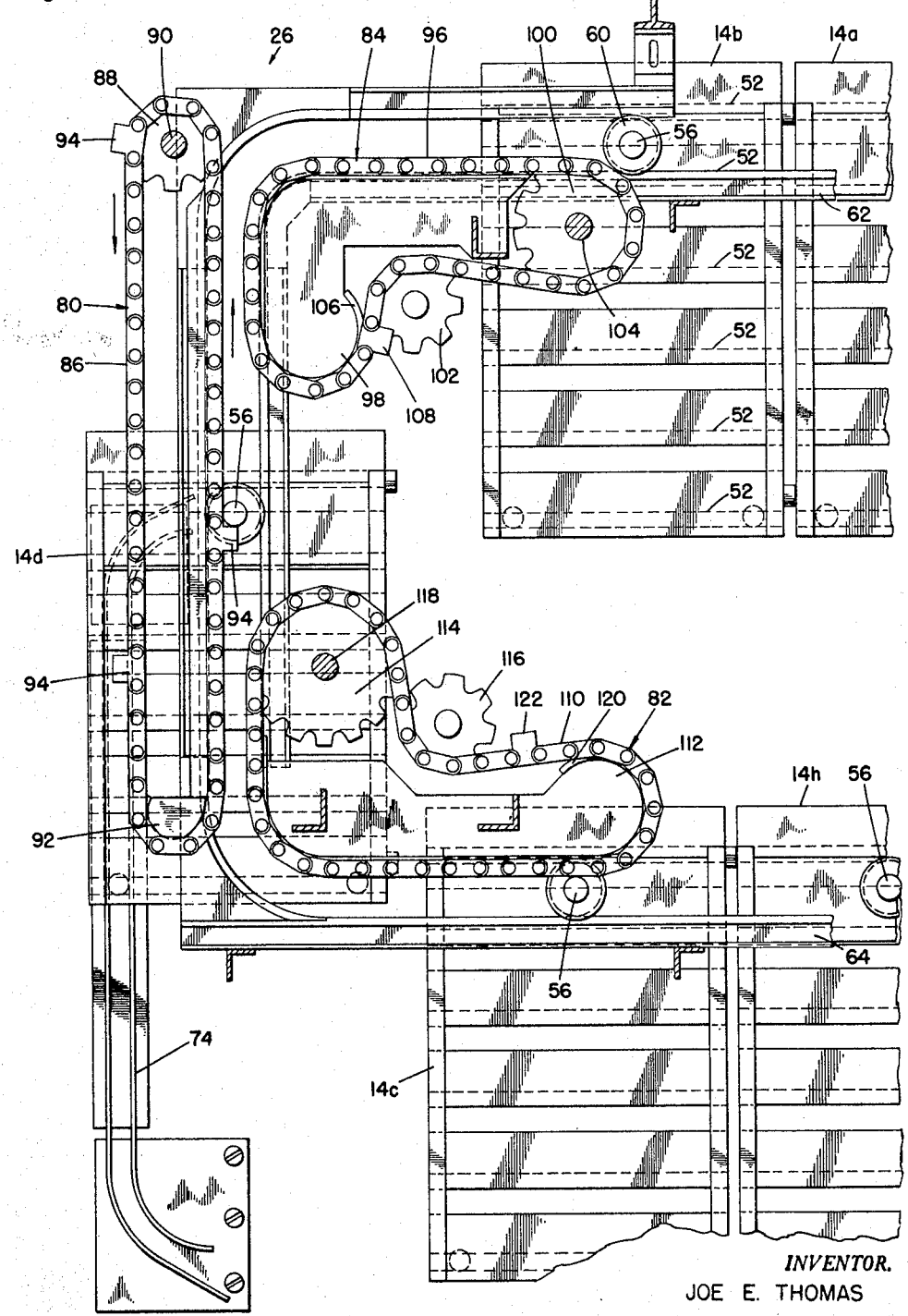
FIGURE 6 is a view in side elevation of the rack elevating means taken on line 6—6 of FIGURE 2.

As previously stated, elevating means 26 raises the racks 14 from the lower run 22 to the upper run 20 through the loading and unloading station 24, and referring generally to FIGURE 1 and more specifically to FIGURES 2, 4 and 6 includes a rack elevating conveyor 80, a rack feeding conveyor 82 adjacent the lower end of rack elevating conveyor 80, and a rack discharging conveyor 84, adjacent the upper end of rack elevating conveyor 80.

The rack elevating conveyor includes a pair of endless chains 86 disposed in parallel vertical laterally spaced planes sufficiently far apart to receive a rack therebetween, as best shown in FIGURE 4. The chains 86 are trained at their upper ends around sprockets 88, which sprockets are fixed on the inwardly projecting ends of short transverse shafts 90 rotatably mounted in suitable bearings carried by outer and inner frames F and F'. At their lower ends, the chains 86 are trained around shoes 92 supported on brackets 93 carried by inner frames F', it being understood that sprockets can be substituted for the shoes 92 if desired.

The lengths of the chains 86 are such as to carry three equidistantly spaced lugs 94, as best shown in FIGURE 6, with the spacing between the lugs being equal to the number of rack shelves 52, six in the present case, multiplied by the distance $h$ between two successive rack shelves. The lugs 94 in their travel along the ascending run of the chains 86 engage the stub shafts 56 of the racks in elevating successive racks 14 through the loading and unloading station, and with the above arrangement of the chains 86 and lugs 94, the distance between the bottom shelf of one rack and the top shelf of a succeeding rack, as the racks are elevated through the loading and unloading station, will be exactly one shelf space $h$ which, as will become apparent, is an important feature. The chains 86 are driven continuously and the means for driving them will be described in detail hereinafter.

Rack discharge conveyor

The rack discharging conveyor 84 moves successive racks from the upper end of the elevating chains 86 rearwardly along the upper tracks 62 to the position shown occupied by rack 14b in FIGURE 6. The rack discharging conveyor 84 includes a pair of endless chains 96 disposed in the same vertical longitudinal plane as the elevating chains 86. Referring particularly to FIGURE 6 showing the construction and relation of elements on the right side of the proofer, the chain 96 is trained around an L-shaped guide 98, a drive sprocket 100 and an idler sprocket 102. The short leg of the L-shaped guide 98 is parallel with the upper portion of the ascending run of the chain 86 and is spaced to distance rearwardly thereof to just permit the stub shaft 56 of a rack to pass between the parallel portions of chains 86 and 96. The long leg of the L-shaped guide 98 is disposed parallel and extends along the outer upper side of the track 62. The drive sprocket 100, which is disposed adjacent the free end of the long leg of the L-shaped guide 98, is fixed on the inner end of a short transverse drive shaft 104 suitably journaled in bearings carried by outer and inner frames F and F', as may best be seen in FIGURE 2.

Referring particularly to FIGURE 6, it will be seen that the lower end of the short leg of the L-shaped guide 98 is provided with an arcuate extension 106, and the junction of the short and long legs is arcuately formed, to thereby provide for smooth travel of the chain 96. The chain 96 carries a lug 108, which is arranged to engage the stub shaft 56 of a rack that has been elevated by the elevating chain 86; lift the rack from a lug 94 of the chain 86; and then move it rearwardly along the track 62 to the position shown occupied by rack 14b in FIGURE 6. It will be understood that the various elements of the rack discharge conveyor 84 described above on the right side of the proofer are duplicated on the left side thereof.

In order that the lugs 108 of the chains 96 can clear the lugs 94 of the chains 86, as a rack is lifted by the lugs 108 from the lugs 94, the lugs 108 are formed with the inner links of the chains 96 while the lugs 94 are formed with the outer links of the chains 86. Optionally, the The chains 96 of the rack discharging conveyor 84 are driven continuously and in time relation with the chains 86 of the rack elevating conveyor 80, by means which will be hereinafter described. This time relation must be such that the lugs 108 of the chains 96 will meet the the lugs 94 of the chains 86, as a rack is lifted by the lugs shafts 56 of successive racks being elevated. It is furthermore important that the rate of travel of the chains 96 be greater than the rate of travel of the chains 86, so that the lugs 108 will lift a rack from the lugs 94 and also move the rack at least a horizontal distance such that its lower trailing edge will clear the leading upper edge of a succeeding rack that is being elevated. Referring particularly to FIGURE 6, the length of the chain 96 is twice the length of the portion of chain 86 between two successive lugs 94, so that operating the chain 96 at twice the speed of chain 86, the lug 108 of chain 96 will always meet a lug 94 of the chain 86, and will pick up a rack and move it a horizontal distance to clear a succeeding rack that is being elevated. While FIGURE 6 shows the lug and chain arrangement on the left side of the proofer, it is understood that this is duplicated on the right side. It is evident that the lugs 108 will lift and push successive racks onto and along the upper tracks 62 to the position shown occupied by rack 14b, and in so doing, the rack 14b will have engaged rack 14a which previously occupied the space shown occupied by rack 14b, and pushed it ahead to the position shown occupied by rack 14a. Consequently all the racks 14 on upper run 20 will be pushed ahead one rack space.

*Rack feeding conveyor*

The rack feeding conveyor 82 moves successive racks along the lower tracks 64 from the position shown occupied by rack 14c into position to be picked up by the elevating conveyor 80. As previously pointed out, the lugs 94 of the elevating chains 86 are spaced a distance apart such that the bottom shelf of one rack and the top shelf of a succeeding rack, as the racks are elevated through the loading and unloading station 24, will be exactly one shelf space h apart. Referring particularly to FIGURES 1 and 6, it is apparent that rack 14c cannot be moved into position to be picked up by the elevating conveyor 80 until the preceding rack 14d has been elevated a distance to provide clearance thereunder for rack 14c. It is also apparent that because of the distance that the rack 14c must be moved at that time, to place it in position to be picked up by the oncoming lugs 94 of the elevating conveyor chains 86, the rack feeding conveyor 82 must travel at a considerably greater speed then the elevating conveyor 80. It is furthermore important that the rack feeding conveyor 82 be operated in timed relation with the elevating conveyor 80, so that racks are presented by the rack feeding conveyor 82 at the proper time to be picked up by the elevating conveyor 80.

The rack feeding conveyor 82 includes a pair of endless chains 110 disposed in the same vertical longitudinal plane as the elevating chains 86. Referring particularly to FIGURE 6 showing the construction and relation of elements on the right side of the proofer, the chain 110 is trained around an L-shaped guide 112, a drive sprocket 114 and an idler sprocket 116. The short leg of the L-shaped guide 112 is parallel with the lower portion of the ascending run of the chain 86 and is spaced a distance rearwardly thereof to just permit the stub shaft 56 of a rack to pass between the parallel portions of chains 86 and 110. The long leg of the L-shaped guide 112 is disposed parallel with respect to the bottom track 64, being offset a short distance above and laterally outward thereof. The drive sprocket 114, which is disposed adjacent the free end of the short leg of the L-shaped guide 112, is fixed on the inner end of a short transverse drive shaft 118 suitably journaled in bearings carried by outer and inner frame members F and F', as may best be seen in FIGURE 2.

Referring particularly to FIGURE 6, it will be seen that the rearward end of the long leg of the L-shaped guide 112, is provided with an arcuate extension 120, and the junction of the short and long legs is arcuately formed, to thereby provide for smooth travel of the chain 110. The chain 110 carries a lug 122, which is arranged to engage the stub shaft 56 of a rack on bottom track 64, when in the position shown occupied by rack 14c, and to push this rack toward the front of the proofer and a short distance upwardly in position to be picked up by the lug 94 of the elevating chain 86, as previously described. It will be understood that the various elements of the rack feeding conveyor 82 described above on the right side of the proofer, are duplicated on the left side thereof.

The chain 110 is arranged to be driven in a clockwise direction, as viewed in FIGURE 6, from the position shown to a position in which the lug 122 is disposed between the parallel portions of the runs of chains 86 and 110, during which the rack 14c is moved to a position to be picked up by the lug 94 of elevating chain 86. The chain 110 is then driven in counterclockwise direction back to the position shown in FIGURE 6, ready to pick up a succeeding rack pushed forward, as hereinafter described, to the position shown occupied by rack 14c. It is of course understood that the chain 110 at the opposite side of the proofer is similarly driven.

In order that the lugs 94 of the chains 86 can clear the lugs 122 of the chains 110 as a rack is lifted by the lugs 94 from the lugs 122, the lugs 122 are formed with the inner links of the chains 110 while the lugs 94 are formed with the outer links of the chains 86. Optionally, the chains 110 can be offset slightly laterally of the chains 86. The means for operating the chains 110 in timed relation with the chains 86, and in the reciprocating manner referred to above, will be described hereinafter in detail.

*Rack lowering means*

Figure 8:
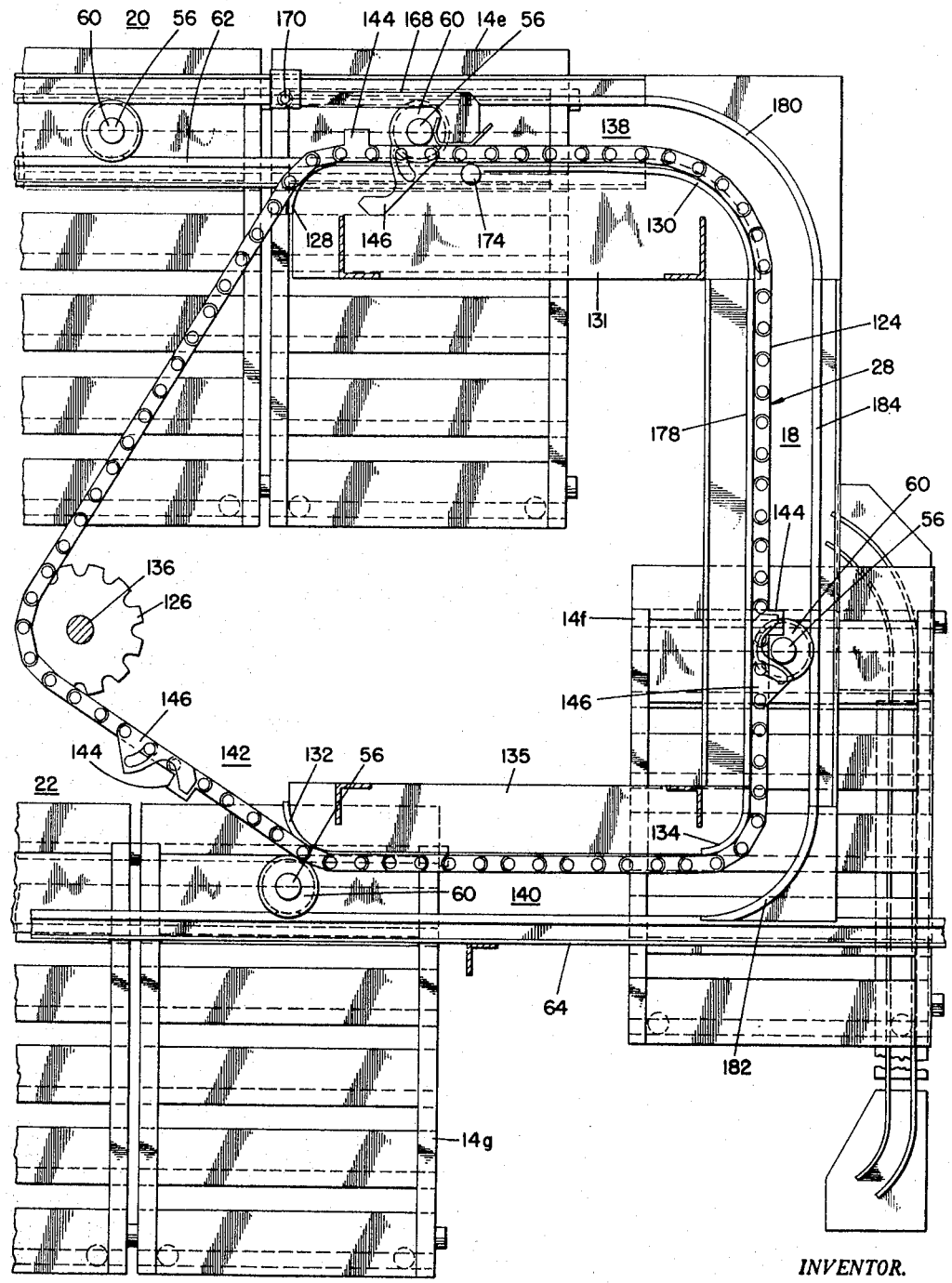
FIGURE 8 is a view in side elevation showing the rack lowering means.

As previously stated, lowering means 28 lowers the racks 14 from the upper run 20 to the lower run 22 and includes a pair of endless chains 124 disposed in parallel vertical laterally spaced planes sufficiently far apart to receive a rack 14 therebetween. Referring particularly to FIGURE 8, there is shown a chain 124 at the right side of the proofer that is trained around drive sprocket 126; curvate upper longitudinally spaced bearing portions 128 and 130 of a shoe 131; and curvate lower longitudinally spaced bearing portions 132 and 134 of a shoe 135. This chain, sprocket and shoe arrangement is duplicated at the opposite side of the proofer.

The drive sprockets 126 are fixed on a transverse through drive shaft 136 journaled at its ends in suitable bearings, not shown, carried by the framework of the proofer. Thus by rotating shaft 136, as later described, both chains 124 are driven. The described sprocket, shoe and chain arrangement provides in the lowering means 28, a horizontal upper run 138 for moving successive racks rearwardly along upper tracks 62 from the position shown occupied by rack 14e; the vertical descending run 18 for lowering successive racks to the lower tracks 64; a horizontal lower run 140 for moving successive racks forwardly along lower tracks 64; and a return run 142.

The chains 124 are each provided with three equidistantly spaced lugs 144 adapted to engage the outer end portions of the rack stub shafts 56 to move the racks along the upper and lower runs 138 and 140 of the chains 124. Latch means, designated as a whole by reference numeral 146, is provided for supporting the racks 14 along the descending run 18 and for smoothly moving the racks around the curve defined by the curvate bearing portions 130 of the shoes 131. A latch means 146, as shown in FIGURE 8, is disposed just ahead of each of the lugs 144 of chain 124, and it is understood that similar latch means is provided on the chain 124 at the opposite side of the proofer.

One of the latch means 146 will now be described in detail, it being understood that this applies to all the latch means 146. Referring to FIGURE 8 and more particularly to FIGURES 9 and 10, the latch means 146 includes a pair of generally triangular latch plates 148, each having a short side edge surface 150 and a long side edge surface 152. The latch plates 148 are pivotally mounted adjacent the junction of their short and long side edge surfaces 150 and 152 at opposite sides of the chain 124 on extensions of a chain pin 154 at the leading end of the second links 156 of chain 124 ahead of the links carrying the lugs 144. The latch plates 148 are mounted on the chain 24 so that the short side edge surfaces 150 lie outwardly of the long side edge surfaces 152, as clearly observable in FIGURE 8.

Extending from the free end of short side edge surface 150 toward the long side edge surface 152 of each of the latch plates 148 is a convex trailing edge surface 158 formed on a radius described from the pivotal axis of the latch plate. The trailing edge surfaces 158 merge into concave edge surfaces 160 extending to the free ends of the long side edge surfaces 152 forming therewith hook-like appendages 162 at the trailing ends of the latch plates 148.

The short side edge surfaces 150 of the latch plates 148 are approximately equal to the length of the links 156, so that when the latch means 146 assumes the position 146′, shown in phantom in FIGURE 9, sufficient space is provided between the lug means 144 and the trailing edge surfaces 158 of the latch plates 148 to receive the stub shaft 56 of a rack.

The long side edge surfaces 152 of the latch plates 148 are of a length such that when the latch means 146 assumes the position 146′, shown in phantom in FIGURE 9, the stub shaft 56 of a rack nests closely in the concave edge surfaces 160 of the latch plate appendages 162. Pivotal movement of the latch means 146 is limited by reason of engagement of extensions of chain pin 164 adjacent the trailing end of the links 156 in arcuate slots 166 in the latch plates 148 adjacent the trailing edge surfaces 158 thereof, whereby the latch means is movable between a retracted position out of the path of a rack stub shaft 56 and an extended position in the path of a rack stub shaft 56 as shown in FIGURE 9, in full and in phantom lines.

As previously explained, when a rack is moved rearwardly by the rack discharging conveyor 84 to the position shown occupied by rack 14b, all the racks on the top run 20 are pushed rearwardly. In order to prevent coasting of the terminal rack to a position where it will interfere with a rack moving downwardly along descending run 18 of the lowering means 28, a hook shaped rack stop 168 is pivotally mounted, as at 170 at each side of the proofer above the upper run 138 of the chains 124. The hooked free end of the pivotally mounted rack stops 168 are each provided with a shoe 172 adapted to rest on a chain 124, the said hooked end being located to stop a rack in the position shown occupied by rack 14e in FIGURE 1.

A short transversely extending bearing member 174 is disposed beneath the upper run of each of the chains 124 below the shoes 172 of the rack stops 168 in the path of the long side edges of the latch plates 148. Referring particularly to FIGURES 9 and 10, showing the above arrangement on the right side of the proofer, it will be seen that when the chain 124 moves in the direction of the arrow from the position shown in full lines, engagement of the long side edge surfaces of the latch plates 148 with the pin 174 after the short side edge surfaces 150 have cleared the rack stub shaft 56, moves the latch means 146 to its extended position, thereby raising the rack stop 168 clear of the rack stub shaft 56 and permitting the lug means 144 to engage the rack stub shaft 56 and move the rack. Thereafter, the rack stop 168 is free to drop down in position to stop the next rack.

The latch means 146 is retained in its extended position, after riding off the pin 174, by engagement with a lateral extension 176 of the upper edge of the shoe 131 and the curved bearing portion 130, as shown in the phantom positions 146′ and 146″ of the latch means 146 in FIGURES 9 and 10. Referring particularly to FIGURE 9, it will be seen that since the lug means 144 and the latch means 146 are attached to separate longitudinally spaced chain links, a progressively wider gap opens up between the lug means 144 and the trailing edge surface 158 of the latch means 146 as they pass around the curved bearing portion 130, as shown in phantom position 146″. Normally this would cause the rack to drop freely through an appreciable distance until the rack stub shaft 56 engages the trailing edge surface 158 of the latch means 146, thereby subjecting the pans of proofed dough carried by the rack to severe shock. Proofed dough is extremely sensitive to shock, frequently causing the collapse thereof and resulting in a poor or unsalable loaf of bread. It is the purpose of the hook like appendages 162 of the latch means 146, previously described, to provide a smooth progressive movement of the rack as it rounds the curved bearing portion 130 from a position wherein the rack stub shaft 56 is engaged by lug means 144 to a position wherein it is engaged by the trailing edge surface 158 of the latch means 146.

Referring to the 146″ position of the latch means 146 in FIGURE 9, it will be seen that as the latch means 146 rounds the curved bearing guide 130, the hook shaped latch appendage 162 in which the rack stub shaft 56 is nestled swings upwardly and rearwardly to progressively move the rack stub shaft 56 away from the lug means 144 and maintains it in engagement with the trailing edge surface 158 of the latch means, to thereby effect a smooth transfer of the rack from the horizontal run 138 to the vertical run 18.

Referring more specifically to FIGURE 8, a vertical chain guide 178 connecting the upper and lower curved chain guides 130 and 134 is provided along the descending run 18 of each of the chains 124 at the inner sides thereof. Disposed in outward spaced relation with respect to upper and lower curved chain guides 130 and 134, and vertical chain guide 178 are respective upper and lower rack wheel guides 180 and 182, and vertical rack wheel guide 184 arranged to be engaged by the rack wheels 60. The chain guides 130, 134, and 178 in cooperation with the rack wheel guides 180, 182, and 184, stabilize the upper portions of the racks as the racks, supported by the latch means 146, descend from the upper horizontal chain run 138 to the lower horizontal chain run 140.

The chains 124 of the lowering means 28 are continuously driven in timed relation with the chains 86, 96 and 110 of the elevating means 26, by means hereinafter described, so that as a rack is being elevated through the loading and unloading station 24, a rack is being lowered at the opposite end of the proofer. Referring to FIGURES 1 and 8, as rack 14f approaches rack 14g, rack 14e is moved from its indicated position by the rack feeding conveyor 82 to a position where it can be picked up by the elevating conveyor 80. Rack 14f is then pushed forward along the lower horizontal chain run 140 by the lug 144, with the rack being supported on lower tracks 64 by reason of engagement of the rack wheel 60 with the tracks 64. When rack 14f has been pushed ahead to the position shown occupied by rack 14g, the lugs 144 disengage rack stub shafts 56 and travel along return run 142. In being pushed ahead to the position shown occupied by rack 14g, rack 14f will have pushed all the racks on lower run 22 ahead one rack space, so that rack 14h will now be located in the position shown occupied by rack 14c, ready to be moved by the rack feeding conveyor 82 in the manner previously described.

*Loading pusher*

Figure 7:
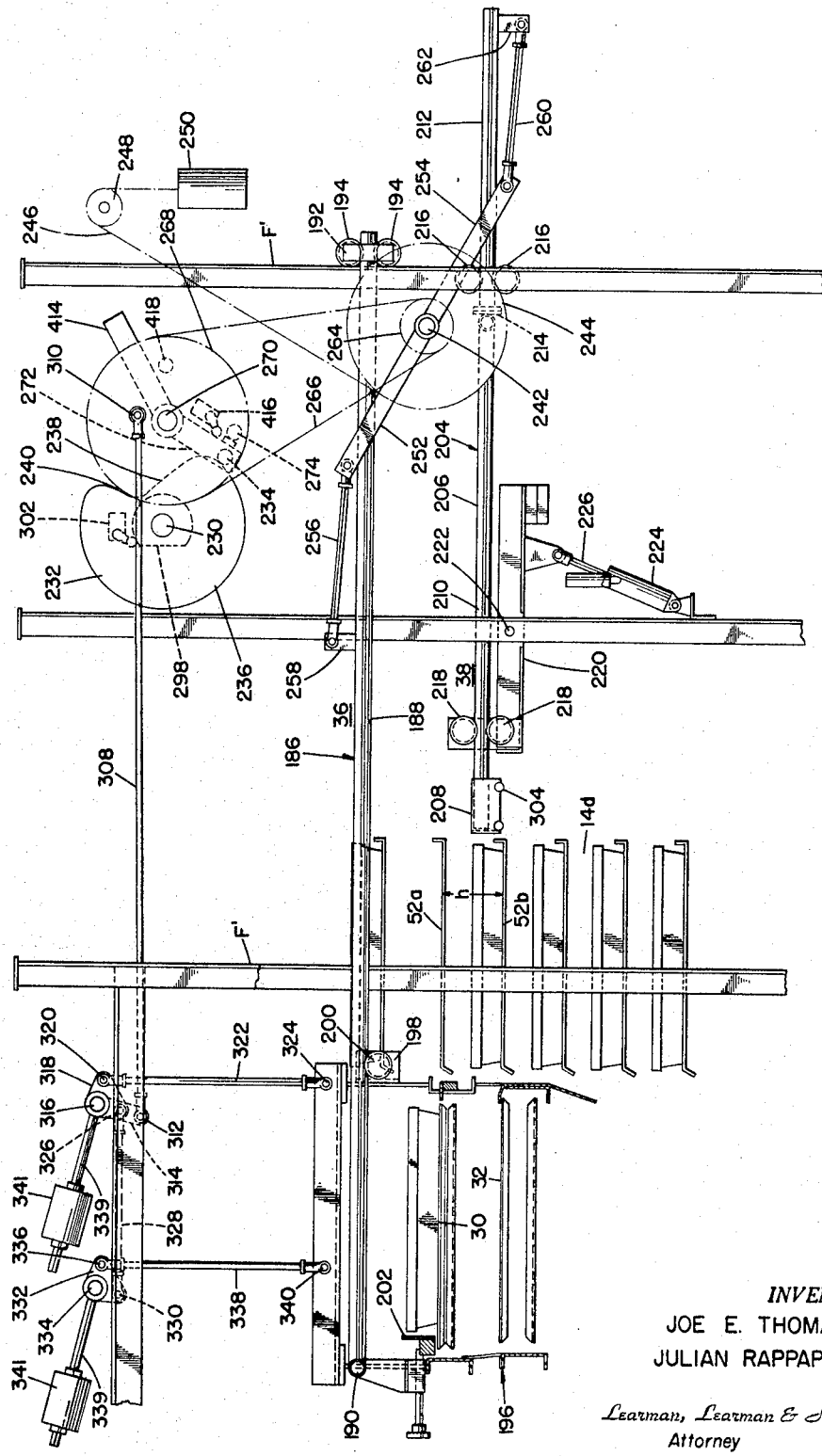
FIGURE 7 is a view in side elevation showing the pusher and conveyor supporting frame operating and control means.

Referring particularly to FIGURES 1, 3, 4, 5, and 7, the loading pusher 36 includes a rectangular frame 186 comprising a pair of laterally spaced, longitudinally extending tubular frame members 188 connected together at their forward ends by a transversely extending tubular frame member 190. Secured to a vertical inner frame member F' at each side of the proofer is a bracket 192 supporting a pair of rear vertically spaced concave rollers 194, as best shown in FIGURES 3 and 7. Secured to each of the upper rear corners of a generally rectangular frame 196 that supports the loading and unloading conveyors 30 and 32 is a bracket 198 that carries a front concave roller 200. The rearward portions of the longitudinal tubular frame members 188 are retained between the vertically spaced rear rollers 194, while the forward portions thereof rest on the front rollers 200, whereby the loading pusher 36 is freely movable in a longitudinal path. A pusher bar 202 is pendently supported from transverse pusher frame member 190 and, as best seen in FIGURES 1 and 7, is adapted to sweep across the loading conveyor 30 to push a row of pans of dough from the loading conveyor 30 onto the shelf of a rack 14. As above described, the forward end portion of the loading pusher 36 is supported by the frame 196 that in turn supports the loading and unloading conveyors 30 and 32, and the significance of this will become clear later in the description. Reciprocating longitudinal movement is imparted to the loading pusher 36 for pushing successive rows of pans of dough from the loading conveyor 30 onto successive rack shelves of successive racks as the racks are elevated through the loading and unloading station 24, as will be hereinafter described in detail.

*Unloading pusher*

Referring particularly to FIGURES 1, 2, 3, 5, and 7, the unloading pusher 38 includes a rectangular frame 204 comprising a pair of laterally spaced, longitudinally extending tubular frame members 206 connected at their forward ends by a transversely extending pusher bar 208. Each of the tubular frame members 206 includes a front section 210 and a rear section 212 having a rigid connection 214, as best shown in FIGURE 7.

The mounting of the tubular frame member 206 at one side of the proofer will now be described with particular reference to FIGURE 7, it being understood that a similar mounting is provided for the tubular frame member 206 at the opposite side of the proofer. The rear section 212 of the tubular frame member 206 is received between a pair of vertically spaced concave rear rollers 216 suitably supported by a vertical inner frame member F.' The front section 210 of the tubular frame member 206 is received between a pair of vertically spaced concave front rollers 218 suitably supported on the front end of a longitudinally extending bracket 220 that is pivotally mounted intermediate its ends, as at 222, on a vertical inner frame member F'.

The overhanging weight of the pusher bar 208 normally tends to swing the forward end of the bracket 220 downwardly about its pivot 222, however, an oil cylinder 224 pivotally mounted at one end to vertical inner frame member F' and having its stem 226 pivotally attached to the rearward end of the bracket 220, prevents such downward swinging movement of the bracket 220 in the extended position of the stem 226, thereby normally retaining the pusher frame 204 in horizontal position. When an upward force is applied to the forward end of the pusher frame 204, as and for the purpose hereinafter described, the pusher frame 204 is free to swing upwardly about the rollers 216 as a fulcrum. Upon such swinging movement of the pusher frame 204, the bracket 220 swings along with it about pivot 222 and stem 226 moves to its retracted position in the oil cylinder 224. When the upward force on the forward end of the pusher frame 204 is relieved, the pusher frame 204 is free to drop by gravity to its original position as shown in FIGURE 7, however, such return movement is dampened or retarded by reason of the fact that the return movement of the support bracket 220 is dampened by the slow movement of the stem 226 of the oil cylinder to its extended position.

Reciprocating longitudinal movement is imparted to the unloading pusher 38 for pushing a row of pans of proofed dough from successive rack shelves of successive racks onto the unloading conveyor 32 as the racks are elevated through the loading and unloading station, as will be hereinafter described in detail.

*Loading and unloading pusher operating means*

Common operating means is provided for imparting reciprocating movement to the loading and unloading pushers 36 and 38. This operating means, as hereinafter described, is arranged to simultaneously move the pushers on their pushing strokes to simultaneously load and unload two successive shelves of a rack as well as the bottom shelf of one rack and the top shelf of a succeeding rack, and to simultaneously move the pushers on their retracting stroke.

Figure 5:
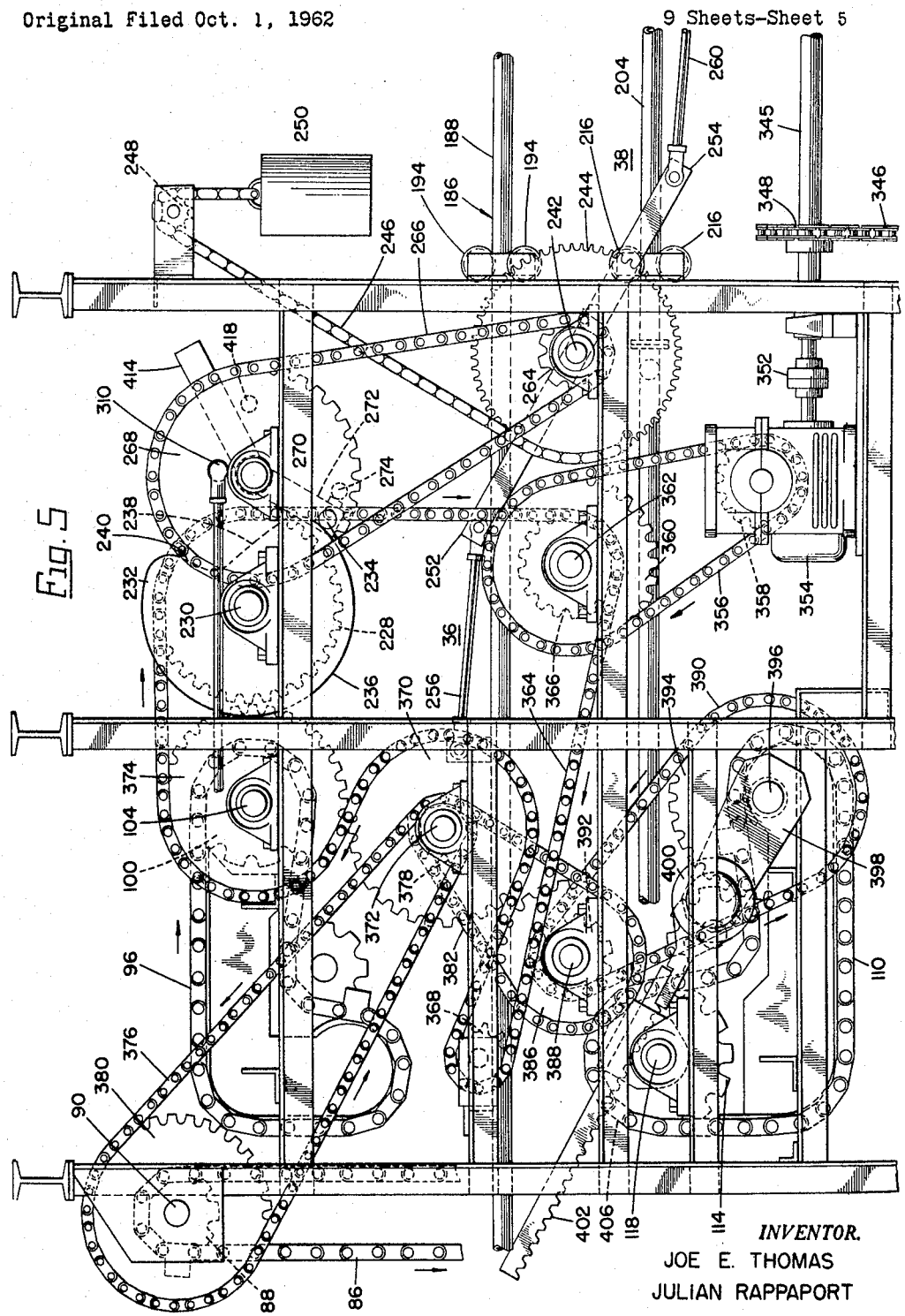
FIGURE 5 is a fragmentary side elevation taken on line 5—5 of FIGURE 3, showing the drive mechanism at the right side of the proofer.

Referring particularly to FIGURES 1, 3, 5 and 7, a sprocket 228 is fixed on a short transverse shaft 230 rearward of the rack discharge conveyor shaft 104 at the right side of the proofer, the shaft 230 being suitably journaled in bearings carried by outer and inner frame members F and F' at the right side of the proofer. The shaft 230 is driven in timed relation with the drive for the rack elevating means, as will be hereinafter described, for synchronizing the operation of the pushers 36 and 38 with the elevation of the racks through the loading and unloading station. A cam 232 is fixed on the shaft 230 laterally outward of the sprocket 228, as best shown in FIGURES 3 and 5, and is arranged to make one compete revolution for each elevation of a rack by the rack elevating chains 86 through one shelf space h. The configuration of the cam 232 controls movement of the pushers 36 and 38 through means, to be described, including cam follower 234.

The cam 232 includes a circular peripheral portion 236 and during the period of each revolution of the cam 232 that cam follower 234 follows cam portion 236, the pushers 36 and 38 remain in rest or inoperative position, as shown in FIGURES 1 and 7. Cam 232 also includes a perimetrical extrant portion 238 which, when followed by cam follower 234, controls movement of the pushers to their extended position for simultaneously loading and unloading a pair of rack shelves. Cam 232 further includes a perimetrical exit portion 240 which, when followed by cam follower 234 controls movement of the pushers to their retracted position.

The timing of the operation of the pushers 36 and 38 with respect to the position of a rack in the loading and unloading station is very simply accomplished. Referring particularly to FIGURE 7, with the pushers in their retracted position, and with a rack positioned so that two shelves are substantially level with the top runs of the loading and unloading conveyors 30 and 32, the cam 232 is fixed on shaft 230 in such position that upon operation of the proofer, cam follower 234 is just about to run off the circular portion 236 of the cam 232 and follow the entrant portion 238 thereof, whereupon with the cam 232 turning in the direction of the arrow, the pushers will simultaneously move through their pushing stroke, then through their retracting stroke, and then remain in retracted position while the cam follower 234 rides along circular cam portion 236, thus completing one cycle while the rack has moved up one shelf space. The cycle is then ready to be repeated.

The pusher operating means between the cam follower 234 and the pushers will now be described in detail, again with reference to the right side of the proofer. Extending transversely through the space between the upper and lower complement of racks adjacent the rear of the pusher members 36 and 38 is a through rock shaft 242, suitably journaled in bearings carried by outer and inner frame members F and F′ at each side of the proofer. Fixed on rock shaft 242 between outer and inner frame members at the right side of the proofer is a sprocket 244. A chain 246 is attached at one end to the periphery of the sprocket 244 and extends upward and rearward therefrom, where it is trained about an idler sprocket 248 and at its free depending end portion has an operating weight 250 attached thereto, as best shown in FIGURE 5. The weight 250 biases the sprocket 244 in a clockwise direction, as viewed in FIGURES 5 and 7.

Secured to the rock shaft 242 at each side of the proofer are a pair of diametrically oppositely extending crank arms 252 and 254. A connecting rod 256 pivotally connects the free end of each of the crank arms 252 with a lug 258 on each of the tubular frame members 188 of the loading pusher 36, and a connecting rod 260 pivotally connects the free end of each of the crank arms 254 with a lug 262 at the rearward end of each of the tubular frame members 206 of the unloading pusher 38. Fixed to the rock shaft 242 at the right side of the proofer just inside the outer frame members F is a small sprocket 264. A chain 266 is trained around sprocket 264 and a large sprocket 268 freely mounted on a short transverse shaft 270 journaled at its ends in suitable bearings carried by outer and inner frame members F and F′ at the right side of the proofer. It is evident then that sprocket 268 is also biased by weight 250 in a clockwise direction, as viewed in FIGURE 5.

Also freely mounted on shaft 270 is an arm 272 at the free end of which the previously described cam follower 234 is supported. A pin 274 is secured to and projects laterally from the sprocket 268 in position to engage the free end of arm 272, and by reason of the bias of sprocket 268, the cam follower 234 is retained in engagement with the cam 232 by the pin 274.

It will be observed that as the cam 232 rotates from the position shown in FIGURES 5 and 7, preventing the entrant portion 238 to the cam follower 234, the sprocket 268 rotates in clockwise direction by reason of the bias effected by the weight 250. Shaft 242 also rotates in clockwise direction whereupon through the previously described connections to the pushers 36 and 38, they are moved to their extended positions to respectively push a row of pans of unproofed dough from loading conveyor 30 onto a rack shelf and a row of pans of proofed dough from a rack shelf onto unloading conveyor 32. Thus the force required to move the loading and unloading pushers through their pushing stroke is wholly supplied by the weight 250.

Upon continued rotation of cam 232, its exit portion 240 exerts a force against cam follower 234, thereby rotating sprocket 268 in counterclockwise direction, as viewed in FIGURES 5 and 7, against the force of the weight 250, whereby shaft 242 also rotates in counterclockwise direction to move the pushers 36 and 38 to their retracted positions.

Loading and unloading conveyors

As previously stated, the loading and unloading conveyors are preferably in the form of endless slat conveyors 30 and 32, which may be constructed in any suitable manner as shown, for example, in Patent No. 2,648,421, granted August 11, 1953, to C. M. Vits. The loading and unloading conveyors 30 and 32 are supported by the rectangular frame 196, as previously noted, and are disposed with their upper runs spaced apart one rack shelf space $h$. To insure the highest degree of smoothness in transferring of pans between the rack shelves and the loading and unloading conveyor, as later explained, the spacing between the upper runs of the loading and unloading conveyors is just slightly greater than a rack shelf space $h$. Referring to FIGURES 1, 4 and 7, the conveyors 30 and 32 extend at one end around respective shafts 276 and 278 journaled in suitable bearings carried by front and rear frame members of the rectangular frame 196. At their opposite ends, conveyors 30 and 32 extend around respective drive shafts 280 and 282 also journaled in suitable bearings carried by front and rear frame members of the rectangular frame 196.

The conveyor drive shafts 280 and 282 are operated from a reduction gear head motor 284 by a sprocket chain 286 trained over sprocket 288 on reduction gear head motor output shaft 290, idler sprocket 292, sprocket 294 fixed on shaft 282 and sprocket 296 fixed on shaft 280, whereby conveyors 30 and 32 are operated in the direction of the arrows in FIGURE 4.

Operation of the motor 284 is controlled by a cam 298 fixed on shaft 230, on which shaft is mounted the pusher controlling cam 232, as previously described, whereby the conveyor 30 and 32 are operated in timed relation with the pushers 36 and 38. The cam 298 is disposed on the shaft 230 so that the high portion 300 engages limit switch 302 to close the circuit to motor 284 at the same time that the circular portion 236 of cam 232 engages cam follower 234, so that the conveyors 30 and 32 will operate while the pushers 36 and 38 are in their retracted positions. The speed of the conveyors 30 and 32 and the extent of the high portion 300 of cam 298 is such, that the conveyors 30 and 32 will travel a linear distance sufficient to respectively introduce a row of pans into the proofer in position to be pushed onto the shelf of a rack and to discharge a row of pans from the proofer before the cam follower 234 runs off the circular portion 236 of cam 232, so that the conveyors 30 and 32 are inoperative while the pushers 36 and 38 are operative. When the limit switch 302 rides off the high portion 300 of cam 298, the circuit to motor 284 is broken to thereby interrupt operation of the conveyors 30 and 32.

As previously pointed out, the loading and unloading conveyors 30 and 32 are supported on frame 196 and are spaced a shelf space $h$ apart. As also previously described, as a rack 14 is being elevated, operation of the pushers 36 and 38 is initiated when a pair of rack shelves are in horizontal alinement with the upper runs of the conveyors 30 and 32. Referring particularly to FIGURE 7, it will be seen that almost immediately upon initiation of operation of the unloading pusher 38, its pusher bar 208 will rest on the surface of rack shelf 52b of rack 14d, whereby as the rack continued to rise, the pusher 38 swings upwardly about flexible connection 216 as it continues on its pushing stroke. To facilitate movement of the pusher bar 208, it is preferably provided at each side with depending rollers 304 adapted to run along tracks 306 of the rack shelves, as best shown in FIGURE 2.

Since the rack 14d moves up continuously, provision is made for raising the frame 196 during the pushing strokes of the pushers 36 and 38 to maintain the top runs of conveyors 30 and 32 in approximate horizontal alinement with the rack shelves 52a and 52b, to thereby prevent a row of pans of proofed dough from dropping onto the unloading conveyor 32 from the rack shelf 52b, and to prevent a row of pans from jamming against the rack shelf 52a as the row of pans is pushed from the loading conveyor 30. The frame 196, and consequently the conveyors 30 and 32, is lowered to its original position during the retracting stroke of the pushers. As previously brought out, the front portion of the loading pusher 36 is supported on the rollers 200 carried by the frame 196, so that the loading pusher 36 is adapted to swing upwardly and downwardly with the frame 196.

In order to synchronize the upward movement of the loading and unloading conveyor frame 196 with the pushing stroke of the pushers 36 and 38, such movement is controlled by the oscillating movement of sprocket 268 in clockwise and counterclockwise direction, as viewed in FIGURE 7. The means for accomplishing this includes a longitudinally extending operating rod 308 having a pivotal connection 310 at its rearward end with the sprocket 268 eccentric with respect to the axis of rotation of the sprocket 268.

The forward end of the operating rod 308 is pivotally connected, as at 312, to one end of a short lever 314. The opposite end of lever 314 is fixed to a transverse through shaft 316, as shown in FIGURES 4 and 7, the shaft 316 being suitably journaled in bearings carried by inner and outer frame members F and F' at opposite sides of the proofer. Thus, as operating rod 308 is reciprocated by oscillating motion of the sprocket 268, oscillating motion is imparted to shaft 316. Also fixed on oscillatable shaft 316 on each side of the proofer between inner and outer frame members F and F' is a bell crank 318. Pivotally connected, as at 320, to one arm of each of the bell cranks 318 is a depending support rod 322. The lower ends of the support rods 322 are pivotally connected, as at 324, with the opposite upper rear corners of the loading and unloading conveyor support frame 196. Pivotally connected, as at 326, to the other arm of each of the bell cranks 318 is a forwardly extending tie rod 328. The forward end of each of the tie rods 328 is pivotally connected, as at 330, to an arm of one of a pair of bell cranks 332. Each of the bell cranks 332 is fixed on a short transverse shaft 334 suitably journaled in bearings carried by inner and outer frame members F and F' at opposite sides of the proofer. Shafts 334 are adapted, therefore, to be oscillated in unison with shaft 316. Pivotally connected, as at 336, to the other arm of each of the bell cranks 332, is a depending support rod 338. The lower ends of the support rods 338 are pivotally connected, as at 340, with upper laterally opposite ends of the frame 196 near the forward side thereof.

It is apparent from the above description of the operating connections between the frame 196 and the intermittently oscillating sprocket 268, and the previously described positioning of cam 232, as shown in FIGURE 7, that when the shelves of a rack 14 are in approximate horizontal alinement with the top runs of loading and unloading conveyors 30 and 32, that the conveyors 30 and 32 move upwardly with a pair of horizontally alined rack shelves and while the pushers 36 and 38 move through their pushing strokes, and move downwardly while the pushers 36 and 38 move through their retracting strokes.

Fixed to each end of the through shaft 316 and to each of the short shafts 334 is a forwardly extending arm 339 to which is adjustably attached a counterweight 341 which bias the shafts 316 and 334 in a counterclockwise direction as viewed in FIGURE 7. Thus by adjusting counterweights 341, the weight of the conveyors 30 and 32 and their supporting frame 196 may be approximately counter balanced to minimize the force necessary to raise them.

It is apparent from the above that cam 232 controls operation of the conveyor supporting frame 196 in the same manner as explained above in connection with operation of the loading and unloading pushers 36 and 38. Thus, during the period of each revolution of cam 232 that cam follower 234 follows circular cam portion 236, the conveyor supporting frame 196 as well as the pushers 36 and 38 remain in rest or inoperative position, as shown in FIGURE 7. Then, as cam follower 234 follows entrant portion 238 of cam 232, the conveyor supporting frame 196 moves upward at the same time that pushers 36 and 38 move through their pushing stroke, the force necessary for such movement being wholly supplied by the weights 250, as previously described. Then, as cam follower 234 follows exit portion 240 of cam 232, the conveyor supporting frame 196 moves downward back to its original position at the same time that pushers 36 and 38 move through their retracting stroke.

As previously explained, during each complete revolution of cam 232, a rack moves upwardly one shelf space $h$, for example eight inches. However, the conveyor supporting frame 196 moves up and the pushers 36 and 38 move to extended position only during that portion of each revolution of the cam 232 represented by entrant portion 238. Thus, during that portion of each revolution of cam 232 that cam follower 234 follows the profile of entrant portion 238, the rack moves up considerably less than half a shelf space. In the present instance the cam 232 is configured so that this distance is about two inches, though this can obviously be increased or decreased by changing the configuration of the cam 232.

In order to provide a smooth transfer of pans between the rack shelves and the conveyors 30 and 32, the conveyor supporting frame 196 is arranged to move upwardly through this same distance of two inches, or preferably just a slightly greater distance. This is readily accomplished by proper selection of the eccentricity of the pivotal connection 310 of operating rod 308 with respect to the axis of rotation of sprocket 268 and the previously described linkage connecting the forward end of operating rod 308 with the conveyor supporting frame 196. Also, by proper selection of the throw of pusher operating crank arms 252 and 254, the pushers 36 and 38 are readily arranged to move on their pushing strokes through a distance necessary to effect transfer of pans between the rack shelves and the conveyors 30 and 32 while the racks are raised through the aforementioned distance of two inches.

It is apparent from the above that since the rack and the conveyor supporting frame 196 move upwardly through the same aforementioned distance of two inches in the same overall time, or in the case of the conveyor supporting frame preferably slightly more than two inches as above noted, they move upwardly at approximately the same rate of speed to thereby provide smooth transfer of pans.

As a matter of actual practice, the leading end section of the entrant cam portion 238 has a flat curving slope, as best shown in FIGURE 7, so that initially the conveyor supporting frame 196 moves upwardly at a slightly slower rate of speed than the rack, then as the cam follower 234 follows the sharply sloping section of entrant cam portion 238, the conveyor supporting frame 196 moves upwardly at a slightly greater rate of speed than the rack. It will be seen, therefore, referring to FIGURE 7, when the forward end of the pan on rack shelf 52$b$ reaches conveyor 32, the latter will be slightly below the shelf 52$b$, to thereby eliminate the possibility of jarring the pan to insure against injury to the sensitive proofed dough. At the same time, of course, conveyor 30 will be slightly below rack shelf 52$a$, however, any jar to a pan being transferred from conveyor 30 to rack shelf 52$a$ would not be particularly objectionable since such pan contains unproofed dough. However, this condition can be preferably corrected by providing a slightly greater spacing between conveyors 30 and 32 than the spacing between the rack shelves, so that at initiation of upward movement of the conveyor supporting frame 196, the conveyor 30 is slightly higher than rack shaft 52$a$.

When the pan that is being pushed from rack shelf 52$b$ reaches an overbalanced position, the conveyor 32 is now rising at a more rapid rate than the rack shelf 52$b$, since cam follower 234 is now following the steeply sloped section of entrant cam portion 238, so that the conveyor 32 is practically flush with the rack shelf 52, particularly if the conveyor 32 is arranged to move upwardly slightly more than the aforementioned two inches, as above noted is preferred. Thus, when the pan being pushed from rack shelf 52$b$ reaches a normally overbalanced position, free fall of the forward end of the pan with consequent jarring thereof, is rendered negligible or is entirely prevented, as is also dropping of the rearward end of the pan upon completion of the pushing stroke. It will be seen from the above that injury to the proofed dough due to jarring of pans during transfer from a rack shelf to the unloading conveyor is substantially completely eliminated. It should be noted that the flat sloping section of entrant cam portion 238 also effects a slow initial speed to the pushers 36 and 38 on their pushing stroke, whereby the shock of engagement thereof with the pans is rendered negligible.

*Drive means*

As above described, the loading and unloading conveyors 30 and 32 are driven from motor 284. The rest of the operating elements of the proofer are operated from gear head reduction motor 342, as shown in FIGURE 1, which is mounted in the lower forward right side of the proofer on a platform 343 supported by inner and outer frame members F and F'. Motor 342 drives a longitudinally extending torque tube 344 journaled in suitable bearings carried by the proofer framework. The drive connection includes a chain 346 trained around sprockets 348 and 350 fixed respectively on the forward end of a vertically offset longitudinally extending torque tube 345 and the rearward end of the torque tube 344. The forward end of the torque tube 345 is connected by a flexible coupling 352, as best shown in FIGURE 5, with the input shaft of a speed reducing unit 354.

A chain 356 is trained around a sprocket 358 fixed on the output shaft of speed reducing unit 354 and a sprocket 360 fixed on a transversely extending through shaft 362 suitably journaled in bearings carried by inner and outer frame members F and F' at each side of the proofer. Referring particularly to FIGURES 2, 3 and 5, a portion of the drive means will now be described with reference to the right side of the proofer, it being understood that a similar arrangement is provided at the left side of the proofer with one difference that will be hereinafter explained. An endless chain 364 is trained around a sprocket 366 fixed on through shaft 362; then extends forwardly around idler sprocket 368; then extends rearwardly around a sprocket 370 fixed on a short transverse shaft 372 suitably journaled in bearings carried by inner and outer frame members F and F' at the right side of the proofer; then extends upwardly around a sprocket 374 fixed on short shaft 104; then extends rearwardly around sprocket 228; and then downwardly back to sprocket 366. As before stated, a similar arrangement is provided at the left side of the proofer, except that chain 364 at the left side of the proofer extends downwardly directly from sprocket 374 to sprocket 366, since on the left side of the proofer there is no sprocket corresponding to sprocket 228 on the right side of the proofer.

At each side of the proofer, an endless chain 376 trained around a sprocket 378 fixed on a short shaft 372 and a sprocket 380 fixed on a short shaft 90 drives a respective rack elevating chain 86. Also, at each side of the proofer, an endless chain 364 drives a sprocket 374, in turn driving a short shaft 104, in turn driving a sprocket 100, in turn driving a respective rack discharge conveyor chain 96. Also, endless chain 364, at the right side of the proofer, rotates sprocket 228, which through the means previously described operates the pushers 36 and 38. Also at each side of the proofer, an endless chain 382 is trained over a sprocket 384 fixed on a short shaft 372 and a sprocket 386 fixed on a short shaft 388 suitably journaled in bearings carried by inner and outer frame members F and F'. An endless chain 390 is trained around sprocket 392 fixed on short shaft 388 inwardly of sprocket 386, as best shown in FIGURE 2, and around a sprocket 394 fixed on a short shaft 396 suitably journaled in bearings carried by an inner frame member F' and a frame member F'' intermediate inner and outer frame members F and F'. Means, now to be described, is provided for converting rotating movement of shafts 396 into reciprocating motion for imparting reciprocating movement to the rack feeding conveyor chains 110.

Fixed to the outer end of each of the short shafts 396 is a crank arm 398. Pivotally attached to the free end of each of the crank arms 398, as to 400, is a rack 402. Each of the racks 402 is arranged to engage a small pinion 404 fixed on each of the rack feeding drive shafts 118, one such pinion being shown on the left side of FIGURE 2, whereby reciprocating motion is imparted to the rack feeding chains 110. A hold down guide 406 is loosely mounted on each of shafts 118 to retain the racks 402 in engagement with pinions 404 while permitting rectilinear motion of the racks 402.

The rearward end of the torque tube 345 is connected with the input shaft of a speed reducing unit 408. A chain 410 is trained around a sprocket fixed on the output shaft of the speed reducing unit 408 and a sprocket 412 fixed on the lowering means through drive shaft 136, thereby operating the chains 124 of the lowering means 28 in the manner previously described.

*Safety limit switches*

Safety means is provided for stopping the motor 342 when for some reason, on the pushing stroke of either of the pushers 36 or 38, a pan becomes jammed by a rack being elevated by the elevating means 26, whereby the elevating means as well as the other components of the proofer operated by the motor 342, are stopped. On the pushing stroke of the pushers, it will be recalled, the cam follower 234, referring particularly to FIGURES 5 and 7, is held against the entrant portion 238 of cam 232 by engagement of pin 274 with cam follower support arm 272, the pin 274, as previously explained, being carried by the sprocket 268 which is urged in clockwise direction by reason of the weights 250. Now, should a jam prevent movement of the pushers during their pushing strokes, the sprocket 268 will stop, but since the cam 232 continues to be rotated by motor 342, a gap tends to form between the profile of cam portion 238 and cam follower 234. However, a counterweight arm 414 formed with the freely mounted end of arm 272, now swings the arm 272 in a clockwise direction about shaft 270 through the gap which tends to form between the profile of cam portion 238 and cam follower 234. In swinging in such clockwise direction, the arm 272 lifts off a normally open limit switch 416 which is carried by the now immobilized sprocket 268. Opening of limit switch 416, which is in circuit with motor 342, stops operation of motor 342, thereby preventing possible damage to the various components of the proofer operated by motor 342. A pin 418 carried by the sprocket 268 is arranged to be engaged by arm 414 to limit the swing of arm 272 just sufficient to open limit switch 416.

It is also apparent that further upward movement of the frame 196 which supports the loading and unloading conveyors 30 and 32 stops when such a jam occurs, since as previously explained such upward movement is responsive to rotation of sprocket 268 in clockwise direction.

The invention has been described with particular reference to its use as a proofer. However, it is readily apparent that with slight changes, the invention is capable of use as a bread cooler, or for treatment of other products in a treating chamber.

We claim:

1. A rack conveyor mechanism for racks having at opposite sides thereof laterally projecting stub shafts, a pair of transversely spaced, parallel horizontal rails for pendently supporting a rack therebetween, a pair of transversely spaced parallel endless chains each including a longitudinal run, a vertical run, and a curvate run connecting said runs, means for guiding said chains along said runs, rack stop means mounted for movement in to a position in the path of said racks on said longitudinal run to prevent coasting of racks beyond said stop means and to a position out therefrom, stub shaft engaging means disposed in spaced relation on said chains, and means carried by said chains for moving said rack stop means to said out position to release said racks to permit them to descend on said curvate and vertical runs.

2. In farinaceous product treating apparatus: means for conducting a succession of racks in a substantially continuous path of travel including upper and lower longitudinally extending support run means for supporting on each a row of racks, and elevator and lowerator means leading between said upper and lower support run means; said lowerator means including endless chain means having a longitudinal run portion and a generally vertical run portion; rack stop means mounted for movement into a position in the longitudinal path of said racks and away therefrom to prevent coasting of said racks; and means carried by said chain means in spaced apart relation for engaging said racks and moving them along the longitudinal run portion and for actuating said rack stop means to a position out of the path of said racks to release a rack for generally vertical travel.

3. In farinaceous product treating apparatus: means for conducting a succession of racks in a substantially continuous path of travel including upper and lower longitudinally extending support run means for supporting on each a row of racks, and elevator and lowerator means leading between said upper and lower support run means; said lowerator means including endless chain means having a longitudinal run portion and a generally vertical run portion; propelling lug means carried by said chain means in spaced apart relation for engaging said racks and moving them along said longitudinal run portion; latch means on said chain means downstream of each lug means movable in to and out from an operative position for supporting the racks in their travel on the generally vertical run portion; and means carried by said chain means for gradually moving said racks from said propelling lug means to rest on said latch means for generally vertical travel in the generally vertical run portion.

4. The combination defined in claim 3 in which said latter means comprises a trailing hoop means carried by said latch means.

5. In farinaceous product treating apparatus: means for conducting a succession of racks in a substantially continuous path of travel including upper and lower longitudinally extending support rail means for supporting on each the laterally extending guides of a row of dependent racks, and elevator and lowerator means leading between said upper and lower support rail means; said lowerator means including endless chain means having a longitudinal run portion, a vertical run portion, and a curvate run portion connecting said run portions; rack stop means mounted for gravity biased swinging movement down to a position in the longitudinal path of said rack guides and upwardly away therefrom; propelling lug means carried by said chain means in spaced apart relation for engaging said rack guides and moving the racks along said longitudinal run portion; latch means downstream from each lug means swingable in to and out from an operative position for supporting the rack guides during vertical travel of the racks and positioned to raise said rack stop means when swung to operative position; and means positioned to be engaged by said latch means and swing them to operative position and thereby raise said rack stop means to a position out of the path of said rack guides to release a rack for vertical travel.

6. In farinaceous product treating apparatus: means for conducting a succession of racks in a substantially continuous path of travel including upper and lower longitudinally extending support run means for supporting on each the laterally extending guides of a row of dependent, contiguous racks, and elevator and lowerator means leading between said upper and lower support run means; said lowerator means including endless chain means having a longitudinal run portion, a vertical run portion, and a curvate run portion connecting said run portions; rack stop means mounted for movement in to a position in the longitudinal path of said rack guides and away therefrom; propelling lug means carried by said chain means in spaced apart relation for engaging said rack guides and moving said racks along said longitudinal run portion; latch means downstream of each lug means swingable in to and out from an operative position for supporting the rack guides in their vertical travel and engageable with said rack stop means for moving them out of the path of said rack guides; means for moving said latch means to operative position as each latch means nears said rack stop means; and means for gradually moving said rack guides from said propelling lug means to rest on said latch means for vertical travel in the curvate and longitudinal run portions.

References Cited by the Examiner

UNITED STATES PATENTS

| | | | |
|---|---|---|---|
| 1,689,099 | 10/1928 | Applegate | 198—85 |
| 1,837,605 | 12/1931 | Baker | 198—85 |
| 1,901,928 | 3/1933 | Olson | 214—16.4 X |
| 2,187,026 | 1/1940 | Hamachek | 198—170 |
| 2,252,033 | 8/1941 | Redler | 198—170 |
| 2,260,528 | 10/1941 | Levy et al. | |
| 2,645,367 | 7/1953 | Stabile | 214—16.12 |
| 2,761,572 | 9/1956 | Baker | 198—85 X |
| 2,823,811 | 2/1958 | Temple | 214—16.4 |
| 3,036,690 | 5/1962 | Kirchhofer | 198—85 X |
| 3,168,187 | 2/1965 | Thomas et al. | 198—85 |

GERALD M. FORLENZA, *Primary Examiner.*

R. B. JOHNSON, *Assistant Examiner.*